United States Patent [19]

Burt

[11] 3,955,192

[45] May 4, 1976

[54] STORM SEVERITY MONITORING SYSTEM

[76] Inventor: Fairis S. Burt, 1139 Airport Road, Hot Springs, Ark. 71901

[22] Filed: Dec. 23, 1974

[21] Appl. No.: 535,396

[52] U.S. Cl. ............................... 340/421; 325/364; 343/788
[51] Int. Cl.² .......................................... G08B 21/00
[58] Field of Search .................... 340/421, 240, 236; 325/364, 365, 466; 73/170 R; 324/72; 343/788

[56] References Cited
UNITED STATES PATENTS

| | | | |
|---|---|---|---|
| 3,753,117 | 8/1973 | Downing, et al | 340/421 X |
| 3,810,137 | 5/1974 | Bacon, Jr. et al | 340/421 |

*Primary Examiner*—John W. Caldwell
*Assistant Examiner*—Daniel Myer
*Attorney, Agent, or Firm*—Ralph R. Pittman

[57] ABSTRACT

An audible alarm storm severity monitor utilizes an electromagnet as a primary sensor in connection with an audio frequency amplifier to modify the conductivity of a silicon controlled rectifier, the conductivity modification effecting a corresponding change in current in an associated direct current audible alarm to sound the alarm. A variable resistance control network is interposed between the amplifier and the SCR to establish a quiescent condition in the absense of any atmospheric electromagnetic disturbance within the detection range of the monitor, this range or sensitivity being selectively determined by means of an appropriate adjustment in the resistance control network.

4 Claims, 1 Drawing Figure

STORM SEVERITY MONITORING SYSTEM

BACKGROUND

While a large number of electromagnetic wave storm detecting systems, varying in complexity, have been described in the prior art, each such system appears to comprise some sort of a radio receiver for delivering a storm signal to a trigger circuit, in order to effect a visual or audible signal indication.

Such systems require a large number of components, including some sort of detector stage between an antenna and an audio frequency amplifier. In addition, the prior art storm severity monitoring systems, once triggered to operate an associated signaling means, continue to signal until manually switched off. The herein-described system is an extremely simple organization relative to the prior art structures, requiring substantially fewer circuit elements to accomplish equal or more advantageous performance.

SUMMARY OF THE INVENTION

An electromagnetic-coil, utilized as a primary sensor or pickup coil is directly connected to an audio amplifier, there being no radio frequency detector stage in the system. The amplifier output is conducted through a resistance network to a silicon controlled rectfier (SCR), effecting a change in conductivity of the rectifier and thereby initiating actuation of an audible alarm in response to electromagnetic atmospheric disturbances occurring in the vicinity of the electromagnet.

Silicon controlled rectifiers are commonly defined as similar in operation to a thyratron, requiring manual switching off once rendered conducting. Contrary to this generally accepted definition, the SCR as embodied in the invention herein may be permanently connected to an energy source which actuates the audible alarm in response to currents induced in the pickup coil, the alarm sounding only if and when a storm-induced current is present in the antenna coil.

The relative small number of components, along with the small energy used in operation, provide a storm severity monitor economically adapted for general residential use in areas subject to intense thunderstorms and the occasional accompanying tornadoes.

DESCRIPTION OF THE PREFERRED EMBODIMENT

Figure 1:
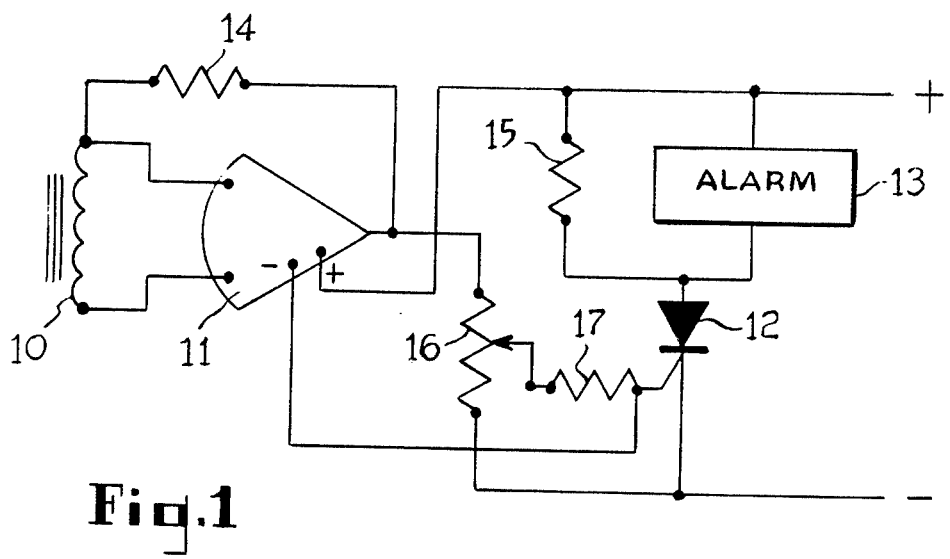
FIG. 1 is the preferred schematic, illustrating symbolically the electromagnet, audio amplifier, SCR and alarm, together with four resistance elements.

Since it is essential that certain components of the system have somewhat specific characteristics in order to coact to yield the results above mentioned, such components will be specified in some detail.

Referring first to the embodiment delineated at FIG. 1, a direct current energy source in the 6 to 9 volt range is applied across a series arrangement of the alarm 13 and the SCR 12, the 500 ohm resistor 15 being bridged across the alarm portion of the circuit. The alarm and the SCR require characteristics similar to those of the Sonalert SC 628, as supplied by The P. R. Mallory Co., Indianapolis, Ind. and the SCR Type S-3, available from General Electric Co., Syracuse, N.Y.

The electromagnet 10 is the primary sensing element for responding to electrical atmospheric disturbances occurring in an approaching storm cloud, and is directly connected to the input terminals of the audio amplifier 11. The optimized construction is a coil about 2 inches (5.12 cm.) wound on a soft iron core of about ⅜ inches (0.96 cm.) diameter with No. 36 American Wire Guage insulated soft copper wire to yield a direct current coil resistance of 200 ohms; however, coils having resistances from 100 to 400 ohms are useable in the system.

The coil requires sufficient resistance to function as a substantially aperiodic pickup, having an essentially constant impedance over a wide frequency range, particularly that of the audio range, and having little if any resonant characteristic. The associated amplifier 11 is a 1 watt, four transistor audio amplifying device, one example of which is Stock No. 99-9097, available from Lafayette Radio Electronics Corporation, Syosset, L.I., N.Y. A 1000 ohm resistor 14 is bridged across the serial arrangement of the pickup coil 10 and the amplifier 11.

A potentiometer 16 having 2000 ohms resistance, and a fixed resistor having 1000 ohms resistance are interposed between the amplifier 11 and the gate of the SCR 12. One terminal of the potentiometer 16 is connected directly to the amplifier, the other potentiometer terminal is connected to a negative terminal of the power supply, and the wiper contact of the potentiometer is connected to one terminal of the fixed resistor 17. The other terminal of the resistor 17 is connected to the gate of the SCR 12 and to the negative terminal of the amplifier power supply, the positive terminal of the amplifier power supply being directly connected to a positive terminal of the power supply.

The potentiometer 16 and the resistor 17 cooperate with the amplifier 11 to provide amplifier controlled switching of the SCR 12. With the potentiometer wiper contact at the upper position, the negative path to the negative amplifier terminal is limited by the serial resistances of the entire potentiometer resistance and the resistor 17, rendering the amplifier 11 incapable of reducing the anode supply to the SCR 12, locking the SCR in the "on" condition to continuously conduct energy to sound the alarm. This condition is useful as a test of the system.

It is apparent that any movement of the potentiometer wiper which increases the resistance from the negative supply terminal to the negative terminal of the amplifier will equally decrease the resistance from the output terminal of the amplifier to the gate of the SCR, and that, when the system is energized, the gate current will be correspondingly changed. With the wiper in the upper position, the resistance between the common positive amplifier output terminal and the SCR gate is at the minimum value; the resistance from the negative supply terminal to the amplifier negative terminal is at the maximum value.

To silence the alarm, the potentiometer wiper contact is moved in the direction to remove from the negative path sufficient resistance to lock the SCR in the "off" condition. This is the sensitive balanced quiescent condition which prevails until unbalanced by the introduction of pickup current into the amplifier to cause the alarm to sound, the system returning to the balanced quiescent condition simultaneously with the disappearance of pickup current. Should it be desired to test the operability of the system while in the balanced quiescent condition, deenergizing and reenergizing of the system will sound the alarm for a period of about one second if the system is in proper operating condition.

The SCR gate being continuously connected, the holding current is the controlling consideration, rather than the latching current which may be several times greater than the holding current, the latching current being the minimum current at which the SCR will latch in the on-state after the gate is disconnected. Holding current, on the other hand, is the current below which the SCR becomes a nonconductor in response to decreasing anode current. Low on-state currents very close to holding current establish a highly sensitive on-state condition, readily switched off by a slight decrease in holding current, corresponding to the quiescent condition of the monitor. Upon attainment of this condition, when a small gate current combines with the normal off-state leakage current, the SCR is triggered to the on-state for the duration of the amplified sensor signal, the atmospheric-initiated pulse of current moving from the amplifier output to the SCR gate.

When the monitoring system is deenergized and then reenergized, the charging of the circuit components causes a very slight time delay before the gate current is stabilized, causing the above-mentioned short-interval test sound. Immediately subsequent, the gate current stablizes at the value determined by the resistance setting, this current value being just under but very close to that current necessary to maintain the SCR forward, or holding current, thus allowing the SCR to return to its sensitive forward blocking condition.

At the quiescent point of maximum sensitivity, any atmospheric disturbance affecting the pickup coil may cause the alarm to sound continuously. Moving the wiper contact slightly beyond the point of maximum sensitivity to add an increment of resistance establishes the system for automatic alarm reset operation. At this setting, the alarm sounds only during the period the storm signal is present in the pickup coil and storms up to 30 miles (48 km) will be indicated by intermittent sounding of the alarm. The frequency of the alarm sounds indicates the severity of the storm, the signal sound even becoming continuous upon the approach of storms of tornadic intensity. Additional increasing increments of potentiometer resistance decreases the range of the system, being reduced to about 10 miles (16 km) at the lowermost position of the wiper contact.

The rapidly repetitive character of warning signal and the information thereby made available is of course not present with any device requiring switching off of the energy source to silence the alarm after each storm signal operation; further; the number of switch operations with manually switched devices may readily become extremely burdensome, a single storm monitored using a manually switched device was found to require 67 switching operations.

The high circuit impedance at the standby balanced point of quiescence limits the energy requirement to a small fraction of a milliampere at 6 volts; about 2 milliamperes is required during the time the alarm is activated.

The system may be contained within a cabinet 7 inches (17.8 cm) long, 5 inches (12.7 cm) in depth, and 4 inches (10.1 cm) high, with the pickup coil about 1½ inches (3.82 cm) high and 1 inch (2.54 cm) diameter mounted on top of the cabinet and a 6 or 9 volt battery inside as an energy source.

What is claimed is:

1. A storm severity monitoring system including an electrically actuated audible alarm effective to indicate both the proximity and severity of approaching storm clouds comprising:
   a low voltage direct current energy source,
   an electromagnet pickup,
   an audio frequency amplifier directly connected to said electromagnet pickup at the input terminals of the amplifier, the positive supply to the amplifier being directly connected to the positive terminal of said energy source,
   an alarm means effective to produce audible sounds when actuated,
   a silicon controlled rectifier having an anode, a cathode and a gate,
   means connecting both said alarm means and the SCR in series, one terminal of said alarm means being connected to the positive terminal of the energy source and the other terminal of said alarm means being connected to the anode of said SCR, the cathode of said SCR being connected to the negative terminal of said energy source and the gate of the SCR being connected to the negative supply terminal of said amplifier,
   potentiometer means having one terminal connected to said amplifier and the other terminal connected to the negative terminal of said energy source,
   a first resistor having one terminal connected to the gate of said SCR and the other terminal to the wiper of said potentiometer means, and
   a second resistor connected in shunt relationship with said alarm means.

2. The storm severity monitoring system as set forth in claim 1, wherein
   the winding of said electromagnet pickup comprises an iron core coil having at least 1500 turns and having a direct current resistance in excess of 100 ohms.

3. The method of concurrently approximating the proximity and the severity of a thunderstorm comprising the steps of
   disposing a nonresonant pickup coil in the field of a series of storm-radiated electromagnetic impulses,
   amplifying the audio frequency currents induced by said series of impulses in said pickup coil, and
   directing the amplified currents to a normally quiescent energized SCR controlled alarm circuit for (a) operating an audible alarm concurrently with the occurrence of each of said impulses and (b) incapacitating the alarm in response to the cessation of each of said impulses.

4. In a storm severity monitoring system which includes a direct current source of energy impressed upon a serial arrangement of an SCR and an alarm audibly responsive to variations of current therein, the improvement comprising:
   an iron-cored electromagnetic coil;
   an audio frequency amplifier having input, output, and positive and negative terminals;
   means directly electrically connecting (1) said coil to the input terminals of said amplifier, (2) the positive terminal of said source to the positive terminal of said amplifier, and (3) the negative terminal of said amplifier to the gate of said SCR;
   a potentiometer including a wiper contact;
   means directly electrically connecting one terminal of the potentiometer to the negative terminal of said source and the other terminal to the output terminal of said amplifier; and means including a resistance element electrically connecting said wiper contact to the gate of said SCR.

* * * * *